United States Patent
Meyers et al.

(10) Patent No.: US 10,863,135 B2
(45) Date of Patent: Dec. 8, 2020

(54) INFORMATION HANDLING SYSTEM INTEGRATED MULTI-ANGLE CAMERA

(71) Applicant: Dell Products L.P., Round Rock, TX (US)

(72) Inventors: David M. Meyers, Round Rock, TX (US); Jason S. Morrison, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/647,463

(22) Filed: Jul. 12, 2017

(65) Prior Publication Data

US 2019/0020850 A1 Jan. 17, 2019

(51) Int. Cl.
*H04N 5/77* (2006.01)
*G06F 1/16* (2006.01)
*H04N 5/217* (2011.01)
*H04N 5/232* (2006.01)
*H04N 5/247* (2006.01)

(52) U.S. Cl.
CPC ........ *H04N 5/772* (2013.01); *G06F 1/1607* (2013.01); *G06F 1/1616* (2013.01); *G06F 1/1686* (2013.01); *H04N 5/2173* (2013.01); *H04N 5/23238* (2013.01); *H04N 5/247* (2013.01)

(58) Field of Classification Search
None
See application file for complete search history.

(56) References Cited

U.S. PATENT DOCUMENTS

| 5,761,550 | A  | * | 6/1998  | Kancigor ........... G03B 15/05<br>362/8 |
| 6,130,783 | A  | * | 10/2000 | Yagi ................. G02B 13/06<br>348/E5.03 |
| 7,071,964 | B1 | * | 7/2006  | Glatt ................ H04N 5/2254<br>348/36 |
| 7,193,653 | B2 | * | 3/2007  | Lee .................. H04N 5/2251<br>348/373 |
| 2002/0067924 | A1 | * | 6/2002 | Yamazaki ....... H04N 1/00307<br>396/429 |
| 2005/0014527 | A1 | * | 1/2005 | Chambers ......... H04M 1/0264<br>455/556.1 |
| 2006/0124746 | A1 | * | 6/2006 | Kim ................. G06K 19/077<br>235/472.02 |
| 2010/0013906 | A1 | * | 1/2010 | Border ............. H04N 5/2259<br>348/36 |

(Continued)

OTHER PUBLICATIONS

Kenny Hemphill, Kogeto Dot 360 Video Lens, The Register, printed Jul. 10, 2017.

*Primary Examiner* — Hung Q Dang
(74) *Attorney, Agent, or Firm* — Zagorin Cave LLP; Robert W. Holland

(57) ABSTRACT

An information handling system selectively extends a camera from a housing along an extension axis to collect light along a plane substantially perpendicular to the extension axis. A mirror structure coupled over a light sensor redirects light from along the plane towards the extension axis and into the light sensor. Distortions of the visual image captured by the light sensor are corrected at the information handling system, such as with a digital signal processor integrated with the light sensor. In one embodiment, the mirror structure moves to direct light from only a portion of the plane towards the light sensor.

20 Claims, 4 Drawing Sheets

(56) References Cited

U.S. PATENT DOCUMENTS

| | | | |
|---|---|---|---|
| 2011/0090381 A1* | 4/2011 | Cote | G06T 3/4015 |
| | | | 348/246 |
| 2012/0162393 A1* | 6/2012 | Okegawa | H04N 5/23209 |
| | | | 348/50 |
| 2015/0189175 A1* | 7/2015 | Fan | H04N 5/2251 |
| | | | 348/37 |
| 2016/0212350 A1* | 7/2016 | Rousseau | H04N 5/23293 |
| 2016/0316046 A1* | 10/2016 | Zheng | H04M 1/0264 |
| 2017/0126971 A1* | 5/2017 | Evans, V | G06T 3/0062 |
| 2017/0237884 A1* | 8/2017 | Evans, V | H04N 5/2254 |
| | | | 348/47 |
| 2017/0244903 A1* | 8/2017 | Yang | H04N 5/2257 |
| 2018/0091716 A1* | 3/2018 | Brand | H04N 5/232 |
| 2018/0292866 A1* | 10/2018 | Tucker | G06F 1/1686 |

\* cited by examiner

INFORMATION HANDLING SYSTEM INTEGRATED MULTI-ANGLE CAMERA

BACKGROUND OF THE INVENTION

Field of the Invention

The present invention relates in general to the field of information handling system visual information management, and more particularly to an information handling system integrated multi-angle camera.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often manage multimedia information, such as audiovisual files. Portable information handling systems have become a popular tool for viewing entertainment, such as movies. Generally, portable information handling systems integrate a display and graphics processor in a portable housing, such as a planar tablet housing or rotationally-coupled housing clamshell or convertible configuration. Multimedia information stored locally, such as in a solid state drive (SSD), or retrieved through a network interface, such as a wireless local area network (WLAN), is presented at the portable display so that an end user can view multimedia content while mobile. In addition, portable information handling systems often include an integrated camera that allows an end user to capture images and videos. A typical tablet planar housing configuration includes a camera facing out the rear side of the housing and another facing out the display side of the housing. An end user typically uses the rear-facing camera to capture images while viewing the captured image on the display. The display-facing camera generally has a poorer resolution and is used for supporting videoconferencing where the end user is looking at the display.

Cameras integrated in tablet information handling systems operate much like conventional cameras that an end user points at an intended target in order to capture an image of the target. Generally, since the camera is integrated in the housing to point out of a relatively thin Z axis, tablet information handling system cameras do not include a focus or zoom system, relying instead on a fixed focus and "digital zoom" that uses processing of captured sensor data to present a zoomed view of the captured image. Cameras in information handling systems having rotationally-coupled housings generally are less flexible to use since the housing configuration changes and the housing tends to be larger and more awkward to manipulate. For example, a typical clamshell housing configuration includes a display in a lid housing portion and a camera near the display and trained to capture images of an end user viewing the camera. Generally, clamshell or convertible information handling systems having a display-side camera are used to perform video conferences where an end user is looking at a display while a camera is capturing an image of the end user. Generally, clamshell or convertible information handling systems do not include a rear-facing camera since the larger and more awkward housing configuration makes capturing external images more difficult than with tablet housings. Since lid housing portions that integrate a display are typically thin structures, integrated cameras in clamshell or convertible systems generally do not have focus or zoom capabilities.

In order to make integrated tablet information handling system cameras more effective, external devices are sometimes coupled over the camera to provide zoom and focus functions. For example, a zoom lens coupled over the tablet information handling system camera lens allows optical enhancements to the integrated camera functionality. In essence, the tablet information handling system converts into a more fully functional camera. As another example, the Kogeto Dot 360 camera attachment couples over a tablet information handling system camera lens to capture a 360 degree view around the tablet information handling system. Such externally attached or clipped-on accessories tend to have a larger overall size due to the distance between the camera sensor and the mirror that optically interacts with incoming light. In addition, when peripheral camera modifications are added to a tablet information handling system, an application running on the main processor

SUMMARY OF THE INVENTION

Therefore, a need has arisen for a system and method which manages camera interactions at a portable information handling system.

In accordance with the present invention, a system and method are provided which substantially reduce the disadvantages and problems associated with previous methods and systems for integrating a camera into an information handling system. A camera retracted into a housing of the information handling system selectively extends outward on an extension axis to capture visual images proximate the housing. A mirror structure integrated in the camera redirects light from a field of view off-axis from the extension axis and into a light sensor for capture of visual images viewable at the information handling system's display.

More specifically, an information handling system processes information with processing components disposed in a portable housing, such as a housing having rotationally-coupled base and lid portions. A camera integrated in the lid portion selectively extends and retracts along an extension axis to capture a field of view off-axis from the extension axis. For example, a mirror structure disposed in the camera redirects light from a field of view substantially perpendicular to the extension axis so that the light enters a camera sensor lens aligned with the extension axis. In one example embodiment, the mirror structure has a concave portion opposed to a circular portion so that a visual image captured at the sensor represents a circular field of view 360 degrees about the extension axis. Distortion introduced by the mirror structure is digitally-corrected to provide a visual image for use at the information handling system, such as with an application executing on a CPU of the information handling system or a dedicated microprocessor integrated in the camera, like a digital signal processor. In various embodiments, directional control of the field of view captured by the camera is provided by selecting a desired portion of the visual image to present at the information handling system and/or manipulating the alignment of the mirror structure and camera lens.

The present invention provides a number of important technical advantages. One example of an important technical advantage is that a camera extends outward from an information handling system housing to capture visual images proximate the information handling system. A mirror structure at an end of the camera redirects light from along a plane perpendicular to an extension axis towards a sensor disposed parallel to the plane. In one embodiment, the mirror structure and sensor are fixedly coupled to each other so that the distance from the mirror to the sensor remains precisely known, allowing more accurate processing of visual information for a mirror of minimal size and reducing contaminant risk where the mirror and sensor interface chamber is sealed. In an alternative embodiment, the mirror structure extends out of the information handling system housing while the sensor remains fixed in position, allowing control of the visual field captured by the camera. A circular and concave mirror structure that includes a mirror actuator provides alignment of light from selected axes towards the light sensor so that an end user has a directional camera. Retraction of the mirror structure into the housing prevents light from entering the camera for enhanced security. In one alternative embodiment, windows formed in the housing allows the mirror structure to direct light towards the sensor while the mirror structure is retracted.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A portable information handling system housing extends a camera having a mirror structure out an extension axis to capture light off the extension axis and directs the light to a sensor aligned to accept the light along the extension axis. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
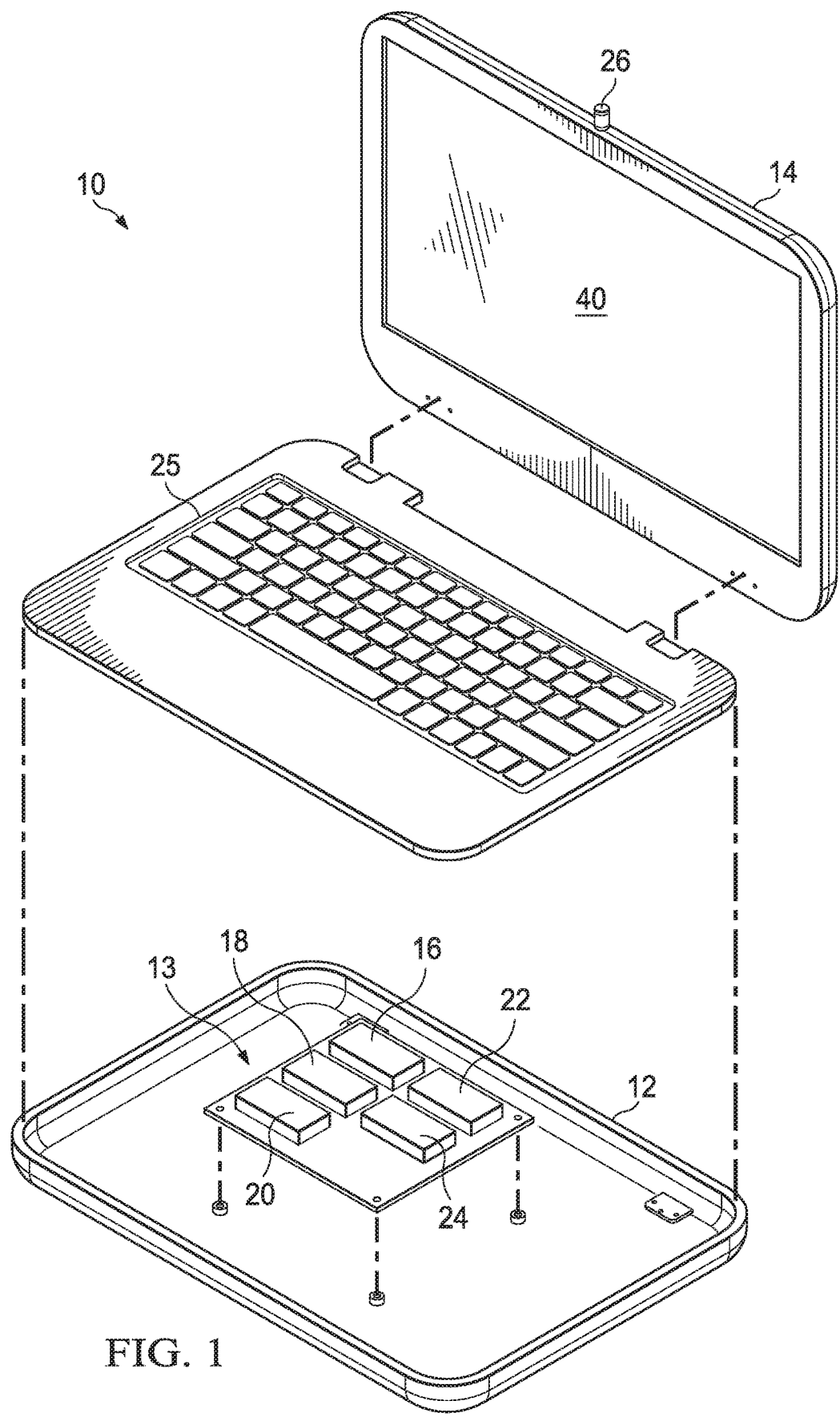
FIG. 1 depicts a side perspective expanded view of a portable information handling system having an extendible camera with off-axis views.

Referring now to FIG. 1, a side perspective expanded view depicts a portable information handling system 10 having an extendible camera 26 with off-axis views. Information handling system 10 has a portable configuration built from a base housing portion 12 and a lid housing portion 14 that are rotationally coupled to rotate relative to each other. A main base housing portion 12 contains processing components that process information. In the example embodiment, a motherboard 13 supports communication between a central processing unit (CPU) 16 that executes instructions to process information, a random access memory (RAM) 18 that stores the instructions and information, and a solid state drive (SSD) 20 or other persistent storage that stores information and instructions. For example, SSD 20 stores applications that execute on CPU 16 to accept end user inputs and generates visual information for presentation to the end user. A chipset 22 interfaces with the other processing components and an embedded controller 24 to manage interactions at a physical level, such as with input/output (I/O) devices like a keyboard 25 that couples to the upper surface of base housing portion 12. Lid housing portion 14 integrates a display 40 that presents information as visual images, such as based upon pixel values communicated from a graphics processor integrated with chipset 22. Although the example embodiment depicts rotationally coupled housing portions, in alternative embodiments, the camera may integrate in tablet or all-in-one housing configurations, as well as in peripheral device housings, such as a display.

During operation of information handling system 10, rotation of lid housing portion 14 to a substantially-vertical orientation relative to a horizontal orientation of base housing portion 12 lifts display 40 to a viewing position relative to keyboard 25. Camera 26 extends out of the upper surface of lid housing portion in the plane defined by display 40 to capture an image of a field of view substantially perpendicular to display 40. Those of skill in the art will understand that the terms substantially perpendicular and substantially aligned as used herein relate to a central axis of light proceeding into camera 26 and out of display 40 that includes light from a field of view related to captured images and presented images. Camera 26 extends outward as depicted by FIG. 1 to capture light for processing into visual images and retracts into lid housing portion 14 when not in use to prevent light capture, such as for mechanically securing camera 26 from unauthorized use. In the example embodiment described in greater detail below, camera 26 includes a mirror structure that captures light for 360 degrees around the extension axis, allowing an end user to have simultaneous capture of visual images at the display side and rear side of lid housing portion 14. With housing portions 12 and 14 in a closed configuration having display 40 rotated proximate keyboard 25 or a tablet configuration having display 40 rotated 360 degrees to expose display 40, camera 26 selectively extends outward to provide image capture capability. In another example embodiment described in greater detail below, camera 26 includes a mirror actuator that provides directional control of camera field of view and zoom.

Figure 2:
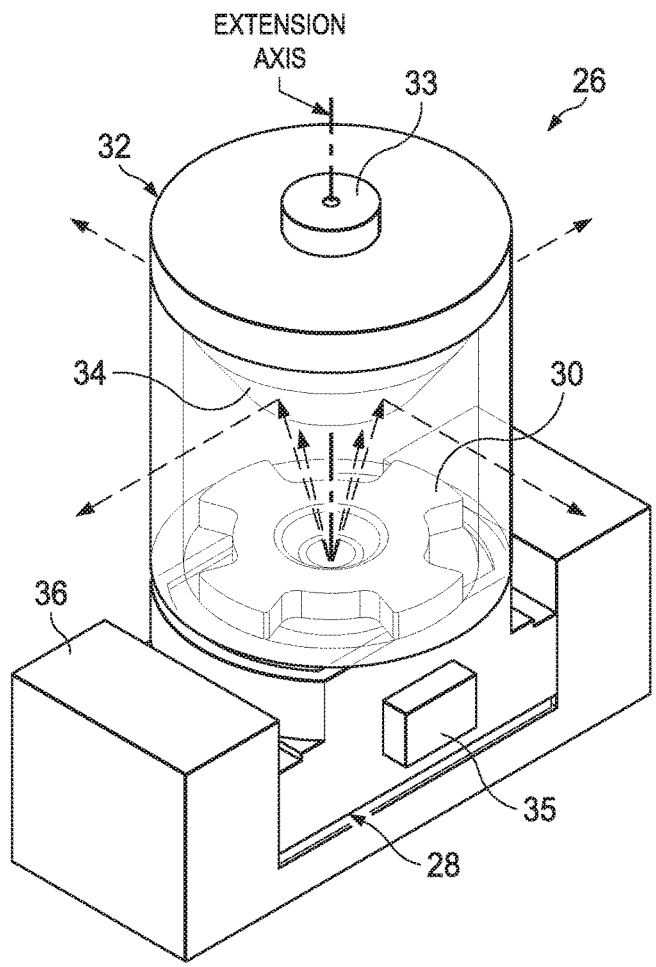
FIG. 2 depicts a side perspective view of a camera 26 engaged in a mount 36 adapted for integration into an information handling system.

Referring now to FIG. 2, a side perspective view depicts a camera 26 engaged in a mount 36 adapted for integration into an information handling system. Camera 26 includes a sensor 28 that captures light and generates digital information representing the captured light. For example, a typical sensor 28 captures light based on megapixel resolutions where each pixel represents a color captured at a location in a plane parallel to the lens 30 that directs light to sensor 28. A mirror housing 32 is disposed above lens 30 and sensor 28 along the extension axis at which camera 26 extends and retracts at lid housing portion 14. Mirror housing 32 redirects light from a field of view along a plane substantially perpendicular to the extension axis to the extension axis and into lens 30. The effect of mirror housing 32 in the example embodiment of FIG. 2 is to provide light around a 360 degree axis from a field of view perpendicular to the extension axis into the lens 30 to generate a visual image similar to a donut view about the extension axis. The visual image captured by light sensor 28 is adjusted by the distance between mirror 34 and lens 30 and the focus setting of lens 30. For example, actuators associated with mirror housing 32 and lens 30 adjust the position of mirror 34 and lens 30 relative to sensor 28 to provide zoom and focus functionality.

Depending upon the relative positions of mirror housing 32, lens 30 and sensor 28, various degrees of distortion may be included in the visual image captured by sensor 28. For example, capture of a donut-like image by sensor 28 360 degrees around the extension axis provides useful information for an end user that is not readily consumed or understood by human nature. To correct distortions introduced by light re-direction, a digital signal processor (DSP) 35 integrates with sensor 28 and adapts captured visual images to a format for end user consumption. For example, DSP 35 receives pixel values from sensor 28 and applies an algorithm to correct distortions based upon the relative positions of mirror housing 34, lens 30 and sensor 28. The corrected distortions may also include selection of part of the visual image to keep and part of the visual image to discard, such as a front view or a rear view or a defined field of view having a lesser degree of distortion. DSP 35 provides an information handling system 10 with visual information as if taken from a camera directed at the selected field of view. As an alternative, sensor 28 may collect visual information as pixel values that are sent uncorrected for distortion to an application running on a processor that performs the distortion correction. Integration of DSP 35 with sensor 28 provides more efficient processing of visual information that offloads duties from the system CPU. In addition to processing visual information, DSP 35 may collect and process audio information collected with a microphone integrated in mirror housing 32.

Figure 3:
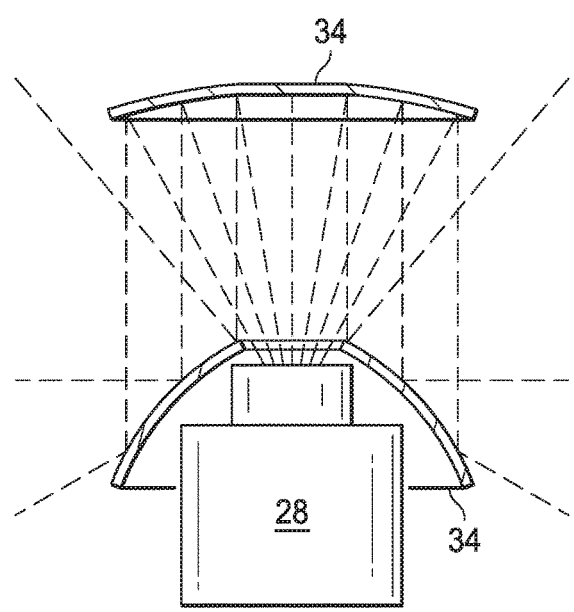
FIG. 3 depicts a side view of a light sensor and mirror structure illustrating an example of light redirection for capturing visual information from off the capture axis of light sensor.

Referring now to FIG. 3, a side view of a light sensor 28 and mirror structure 34 depicts on example of light redirection for capturing visual information from off the capture axis of light sensor 28. Light enters mirror structure 34 from a field of view that is substantially perpendicular to the field of view captured by light sensor 28. A curved mirror 34 disposed around the perimeter of lens 30 redirects the light away from lens 30 towards a concave mirror 34 disposed over lens 30, which in turn redirects the light towards lens 30 for capture by light sensor 28. The size, curvature and orientation of mirrors 34 determine the relative light path followed by light entering mirror housing 32 and provide a tool for managing the field of view captured by light sensor 28. For example, shift the relative orientation of any mirror 34, the focus of lens 30 and/or the distance between mirrors 34 and lens 30 provide directional and zoom control of the field of view captured by lens 28. Feedback of orientation and distance information to DSP 35 provides automated adjustment of the distortion correction algorithm applied by DSP 35 to output a desired field of view to the information handling system 10.

Figure 4:
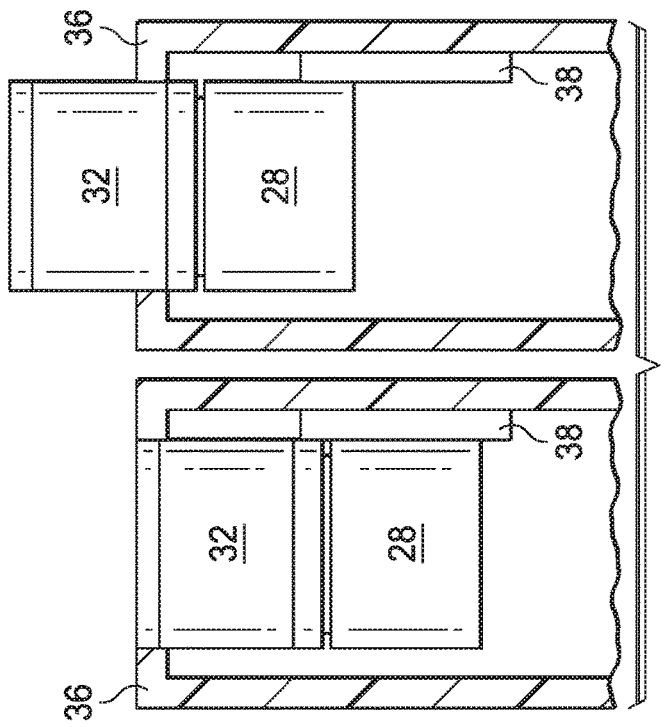
FIG. 4 depicts a side view of a camera in one example embodiment having an actuator arrangement for extending and retracting the camera.

Referring now to FIG. 4, a side view of camera 26 depicts one example embodiment of an actuator arrangement for extending and retracting camera 26. In the example embodiment, a sensor portion 28 fixedly couples to a mount 36 that guides extension of a separate mirror assembly 32 out of an information handling system. Directly mounting a camera light sensor 28 provides a fixed electronic connect so that a flexible printed circuit or other cable interface does not have to travel as sensor 28 electronics move. Movement of mirror assembly 32 provides a separate physical part that can have a unique ID that combines with a common sensor 28 across different platforms. In addition, changing the distance between mirror assembly 32 and sensor 28 provides a tool for varying zoom and focus of light entering sensor 28. An actuator 38 couples to mount 36 and mirror assembly 32 to selectively move mirror assembly 32 as command by an information handling system. Actuator 38 may, for example, provide feedback to DSP 35 or other compensation devices to aid in image distortion correction.

Figure 5:
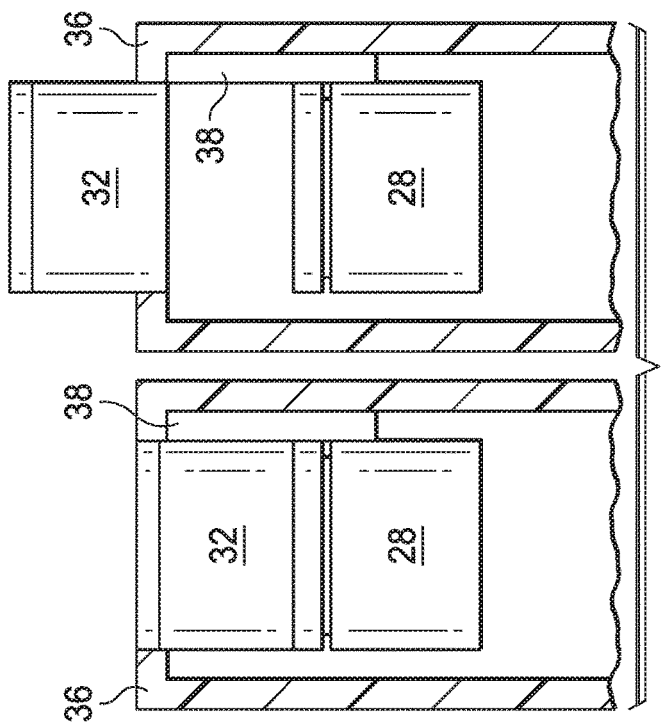
FIG. 5 depicts a side view of a camera in an alternative example embodiment having an actuator arrangement for extending and retracting the camera.

Referring now to FIG. 5, a side view of camera 26 depicts an alternative example embodiment of an actuator arrangement for extending and retracting camera 26. In the example embodiment, sensor 28 and mirror assembly 32 are fixed together so that the entire assembly of camera 26 moves as mirror assembly 32 extends out of mount 36 and retracts back into mount 36. An advantage of fixedly coupling sensor 28 and mirror assembly 32 to each other is that the distance between mirror assembly 32 and sensor 28 is tightly controlled at the camera 26 module level. Smaller tolerances between mirror and sensor parts allows the size of mirrors to be minimized, resulting in a smaller overall size for camera 26. Further, a sealed chamber between sensor 28 and mirror assembly 32 reduces contaminants and foreign object ingress that can deteriorate the quality of captured visual images. Actuator 38 fixes to mount 36 and the camera assembly to extend and retract mirror assembly 32 out of information handling system 10. In various embodiments, actuator 38 may have different types of mechanisms for extending and retracting camera 26. For example, a spring loaded push button mechanism may release camera 26 when pressed upon and latch camera 26 in place when pressed back in place. Alternatively, software and/or firmware may initiate extension or retraction of camera 26 with muscle wire (such as NiTi alloy), a solenoid, a micro-motor, a micro fluid pump, etc. . . . . For example, with the separate mirror and sensor portions depicted by FIG. 4, DSP 35 or other types of processors/controllers, manage the amount of movement of the mirror portion relative to the sensor portion and provide feedback of the position so that lens location and sensor output preprocessing provide distortion correction that relates to the actual captured field of view of the camera 26.

Figure 6:
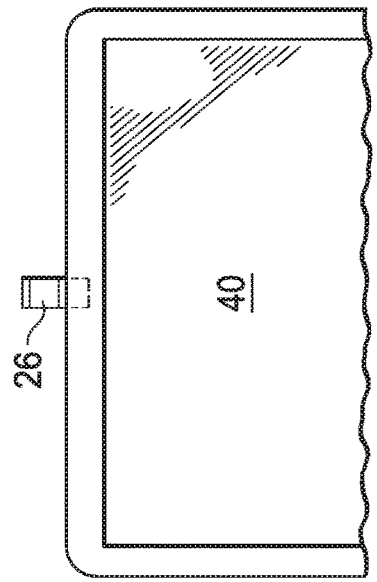
FIG. 6 depicts a side view of an example embodiment of an information handling system lid housing portion having a pop-out camera.

Referring now to FIG. 6, a side view depicts an example embodiment of an information handling system lid housing portion 14 having a pop-out camera 26. In the example embodiment, camera 26 stores within lid housing portion 14 and extends out of the upper surface of lid housing portion 14 along an extension axis proceeding vertically above information handling system 10. In the extended position, camera 26 has a 360 view around information handling system 10 and visual images captured by camera 26 are presented at display 40. Although camera 26 is depicted in a central location, in alternative embodiments camera 26 may be located at a side location so that additional internal space is available to integrate camera 26. In embodiments having separated mirror and lens portions, an extended internal space for location of the extension axis provides a greater focal length between the mirror and sensor so that greater zoom control may be obtained. In yet another alternative embodiment, camera 26 may extend out a side of housing portion 14 instead of the top surface. If a side extension axis is used, alternative mirror arrangements may be used to control the field of view of camera 26. For example, the field of view may remain oriented on a vertical axis even though camera 26 extends outward on a horizontal axis.

Figure 7:
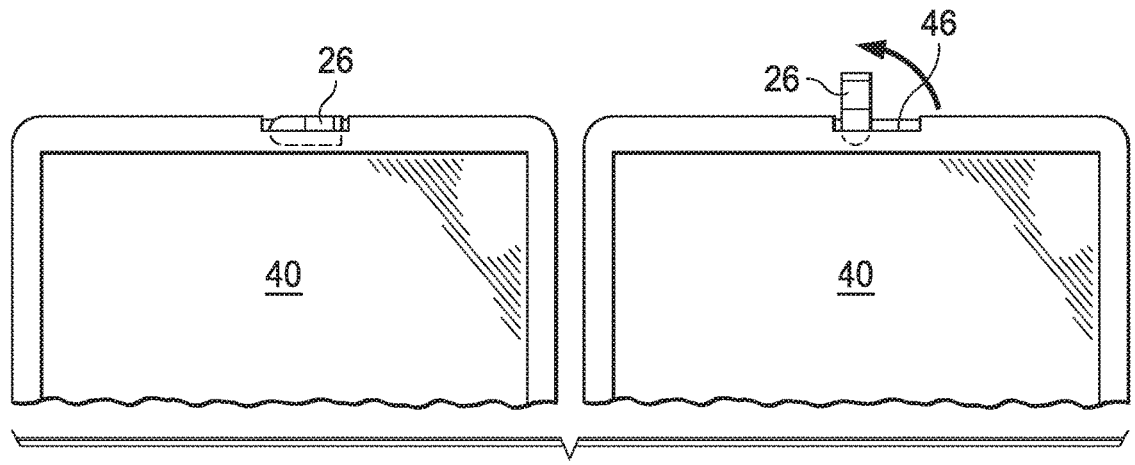
FIG. 7 depicts a side view of an alternative example embodiment of an information handling system lid housing portion having a pop-out camera.

Referring now to FIG. 7, a side view depicts an alternative example embodiment of an information handling system lid housing portion having a pop-out camera. Camera 26 fits in a slot 46 and rotates from a horizontal to a vertical orientation. In alternative embodiments, different mechanical arrangements may be used to extend and retract camera 26.

Figure 8:
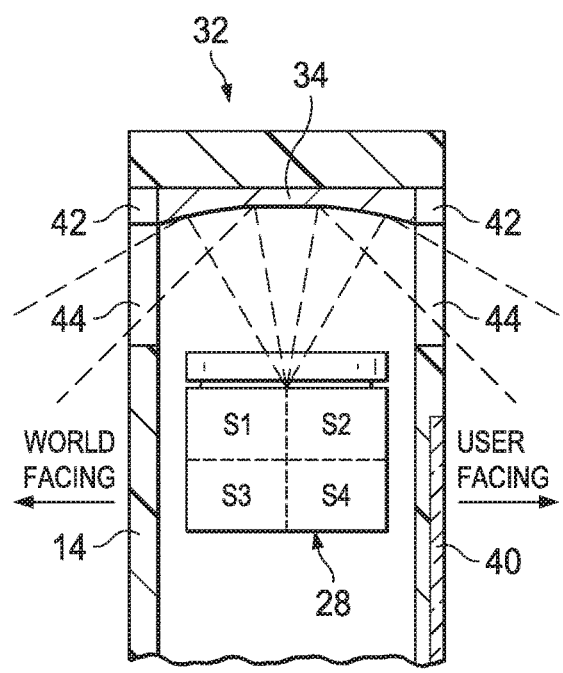
FIG. 8 depicts a side cutaway view of interaction of mirror elements and sensor elements to provide directional control of captured images.

Referring now to FIG. 8, a side cutaway view depicts interaction of mirror element 34 and sensor elements 28 to provide directional control of captured images. In the example embodiment, a MEMS actuator 42 moves mirror 34 to directionally control the axis of the field of view centered into sensor 28. Thus, for example, an end user who is doing a video conference can have a higher quality captured image with the field of view of camera 26 centered towards the front of information handling system 10. For instance, a center portion of mirror 34 may have less distortion than outer portions so that centering the mirror on a desired field of view will provide a higher quality image that has less need for distortion correction. In addition, sensor 28 may be divided into logical portions that are selectively activated to present to an end user. Although the example embodiment presents MEMS actuator 42 as interacting with an upper mirror 34, in alternative embodiments, other actuators and other mirrors may adjust as needed to ensure that a desired field of view is captured.

Figure 9:
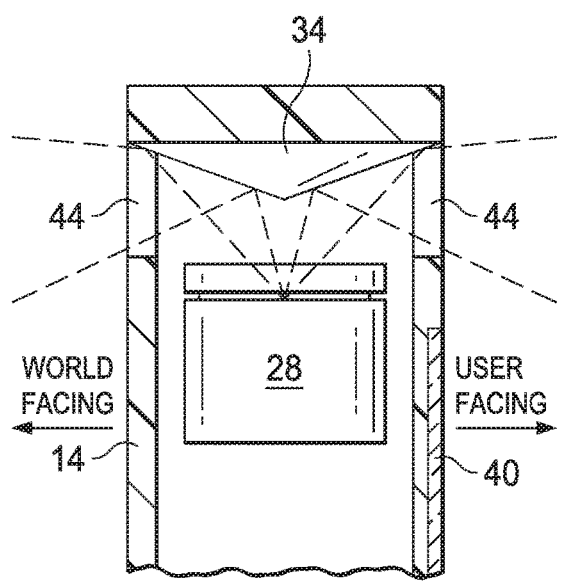
FIG. 9 depicts a side cutaway view of a camera arrangement for capturing visual images while the camera is retracted into the lid housing portion.

FIG. 9 depicts a side cutaway view of a camera 26 arrangement for capturing visual images while the camera 26 is retracted into the lid housing portion 14. Mirror 34 has a splitting mirror configuration instead of a concave configuration. A slot shaped window 44 has a transparent material that allows light to pass through both a display 40 side and a rear facing side of information handling system 10 lid housing portion 14. Light enters window 44 and is directed through a lens 30 and into sensor 28. In the example embodiment, camera 26 has a fixed location with just a rear and front field of view. In an alternative embodiment, windows 44 provide a limited view for camera 26 when camera 26 is retracted, however, camera 26 extends as described above to provide a greater field of view when desired. For example, the concave mirror configuration may use a slot window 44 when retracted by processing out the portions of the captured image that do not align with the slot window. When extended, the concave mirror configuration provides a full 360 degrees of captured images. DSP 35 automatically applies a first distortion correction algorithm when camera 26 is retracted to filter out views blocked by the housing 14 and a second distortion correction algorithm when camera 26 is extended to allow the end user to have access to the full viewing area as desired.

Although the present invention has been described in detail, it should be understood that various changes, substitutions and alterations can be made hereto without departing from the spirit and scope of the invention as defined by the appended claims.

What is claimed is:
1. An information handling system comprising:
first and second rotationally-coupled housing portions;
a processor integrated the first housing portion and operable to process information by executing instructions;
a memory integrated in the first housing portion and interfaced with the processor to store the information and instructions;
a graphics processor disposed in the first housing portion and interfaced with the processor, the graphics processor operable to process the information into pixel values;
a display integrated in the second housing portion, the display interfaced with the graphics processor to present visual images with the pixel values;
one camera integrated in the second housing portion, the camera having a single light sensor that converts detected light into digital information and having a mirror housing that directs light towards the single light sensor, the mirror housing having a mirror with at least a circular portion that reflects light from 360 degrees about a reflection axis, the reflection axis co-planar with the display;
an actuator interfaced with the camera, the actuator selectively retracting the camera into the second housing portion and extending the camera out of the second housing portion along an extension axis aligned with the reflection axis, the mirror directing light 360 degrees from off the extension axis into the sensor; and
a transparent window integrated in the second housing portion proximate the camera, the camera aligned with the transparent window when retracted into the second housing by the actuator to capture visual images both through the transparent window when retracted and free of the transparent window when extended outside the second housing portion;

wherein logic executing on the processor selects a field of view of the camera based upon whether the camera retracts or extends.

2. The information handling system of claim 1 further comprising:
non-transitory memory integrated in one of the first and second rotationally-couple housing portions; and
instructions stored in the non-transitory memory, the instructions executing on a processor to correct distortions of an image represented by the light sensor digital information, the distortions introduced by the mirror.

3. The information handling system of claim 2 wherein the instructions comprise an application executing on the processor.

4. The information handling system of claim 2 further comprising:
a digital signal processor integrated in the camera and interfaced with the sensor to accept the sensor digital information;
wherein the digital signal processor corrects the distortion for output directly from the camera of the corrected image.

5. The information handling system of claim 4 further comprising a mirror actuator interfaced with the mirror and the digital signal processor, the mirror actuator moving the mirror to selectively direct light to the digital sensor, the digital signal processor correcting distortion based at least in part on the mirror actuator position.

6. The information handling system of claim 2 wherein the camera light sensor and mirror housing integrate into a contiguous structure extended by the actuator.

7. The information handling system of claim 2 wherein the camera light sensor and mirror housing are configured as separate structures, the camera light sensor fixed to the second housing portion, the actuator elevating at least a concave mirror portion of the mirror housing out of the second housing portion.

8. The system of claim 7 further comprising:
a focusing element associated with a lens disposed between the camera light sensor and the mirror housing;
wherein the actuator adjusts zoom by adjusting the distance between the camera light sensor and the mirror housing, the focusing element adapting camera light sensor focus based at least in part upon the distance between the camera light sensor and the mirror housing.

9. The system of claim 8 further comprising:
first and second transparent slots integrated in the second housing portion to align with the mirror housing when the actuator retracts the camera into the second housing portion;
wherein the sensor captures front and rear images relative to the second housing portion with light that passes through the first and second transparent slots.

10. A method for capturing visual images at an information handling system, the method comprising:
integrating a camera within a housing of the information handling system, the camera having a single light sensor;
extending the camera out from the housing along an extension axis, a light sensor of the camera disposed substantially perpendicular to the extension axis;
directing light received from 360 degrees around the extension axis and substantially perpendicular to the extension axis through a mirror structure and into the light sensor, the mirror structure including at least a circular mirror portion disposed through the extension axis;
adjusting zoom of the light provided by the mirror structure to the light sensor by moving the mirror structure to change the distance between the mirror structure and the light sensor to change the zoom of the image, the light sensor including lens at a fixed position to focus the image separate from the zoom;
correcting distortion introduced by the mirror structure to generate a visual image of the light collected through the mirror structure; and
processing a limited field of view of the camera through a transparent window when the camera retracts into the housing.

11. The method of claim 10 wherein the mirror structure has first and second mirrors, the method further comprising:
collecting light 360 degrees around the extension axis with a first mirror having the circular mirror portion aligned substantially perpendicular to the extension axis; and
directing the light from the first mirror to a second mirror having a concave mirror portion disposed above the light sensor along the extension axis, the second mirror directing the light into the light sensor.

12. The method of claim 11 further comprising:
integrating the first and second mirrors and the light sensor in a contiguous structure; and
extending the camera by extending the contiguous structure.

13. The method of claim 11 further comprising:
separating the first and second mirrors and the light sensor into different structures;
fixedly coupling the light sensor to the housing and
extending the camera by extending the mirror structure relative to the fixed light sensor structure.

14. The method of claim 13 further comprising:
selectively adjusting zoom of the camera by adjusting the distance between the mirror structure and light sensor structure; and
correcting focus for the adjusted zoom with a lens disposed proximate the light sensor.

15. The method of claim 10 further comprising:
integrating a digital signal processor into the camera and interfaced with the sensor; and
correcting distortion by processing information captured by the light sensor with the digital signal processor.

16. The method of claim 15 further comprising:
detecting a camera configuration; and
in response to the camera configuration, adapting the digital signal processor to process the information captured by the light sensor with a processing algorithm associated with the detected camera configuration.

17. The method of claim 16 further comprising:
manipulating one or more of the mirrors with a mirror actuator to change the camera configuration; and
in response to the manipulating, re-programming the digital signal processor with a processing algorithm associated with mirror alignment for the camera configuration.

18. The method of claim 17 wherein the mirror actuator comprises a MEMS device.

19. A camera comprising:
a mount configured to integrate into a portable information handling system housing;

a single light sensor integrated in the mount and aligned to capture light along a first axis;

a mirror structure integrated in the mount and fixedly coupled to the light sensor, the mirror structure having a circular portion redirecting light received along a plane perpendicular to the first axis to align with the first axis and away from the light sensor and having a concave portion redirecting the light towards the light sensor, the redirected light from 360 degrees around the first axis;

an actuator coupled to the light sensor and the mirror structure, the actuator moving the mount relative to the housing along the first axis to retract and extend the mirror structure, the mirror structure aligned with an opening of the mount to receive light along the second axis when retracted in the mount, the light sensor capturing visual images with the mirror structure both retracted and extended, the light sensor capturing visual images about 360 degrees of the first axis when extended and less than 180 degrees of the first axis when retracted; and non-transient memory storing instructions that when executed on a processor present a partial image captured by a partial field of view of the camera when the camera is retracted.

20. The camera of claim 19 further comprising a mirror actuator coupled to the mirror structure and operable to adapt the mirror structure to direct less than the 360 degrees towards the light sensor.

* * * * *